Dec. 25, 1945.   F. W. SEYBOLD   2,391,648
AUTOMATIC TRANSMISSION
Filed Oct. 27, 1943    6 Sheets-Sheet 5
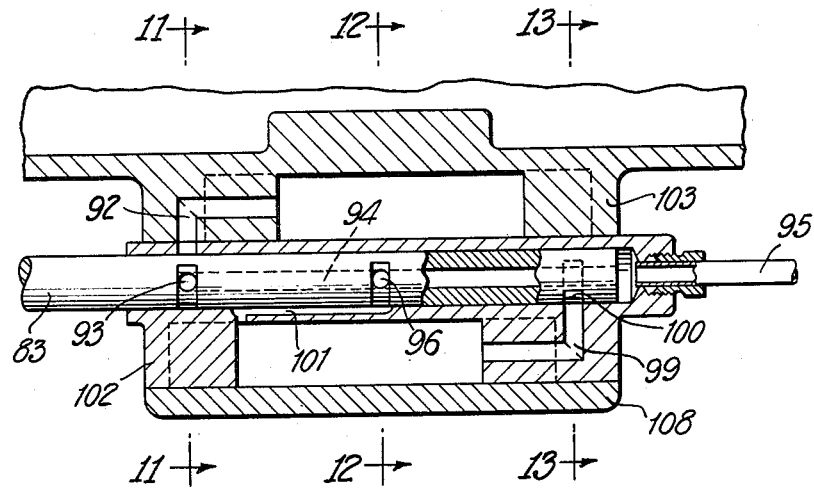
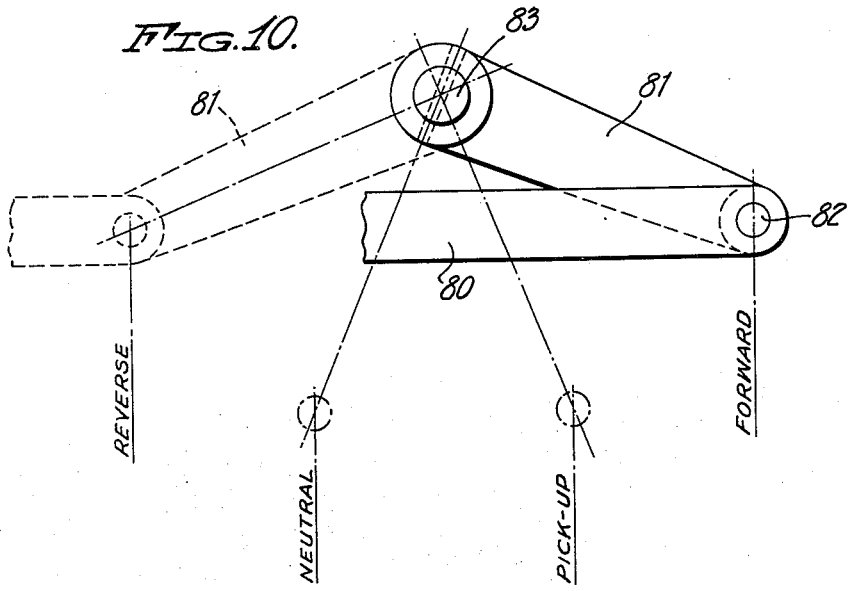
INVENTOR
Frederick W. Seybold

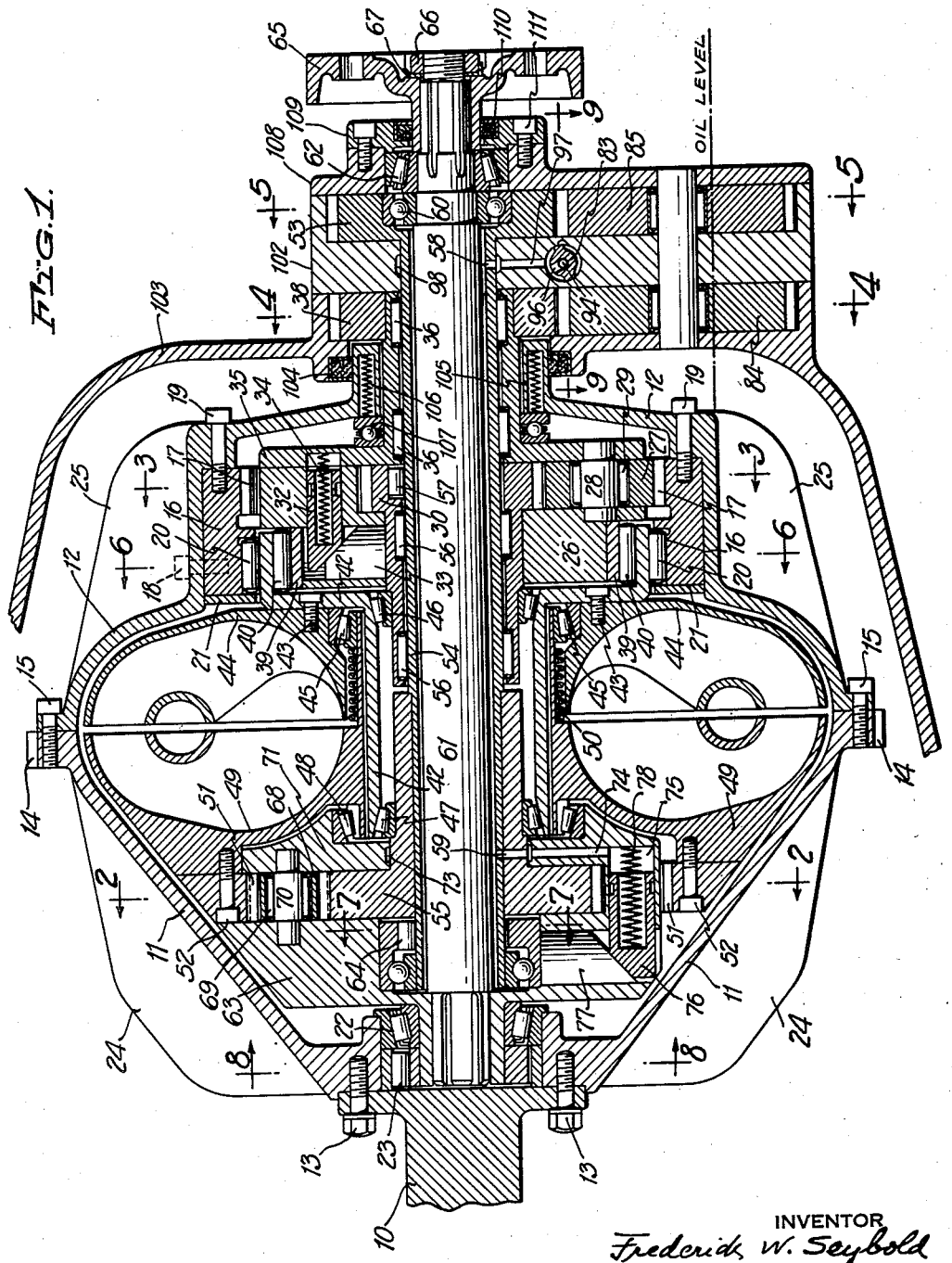

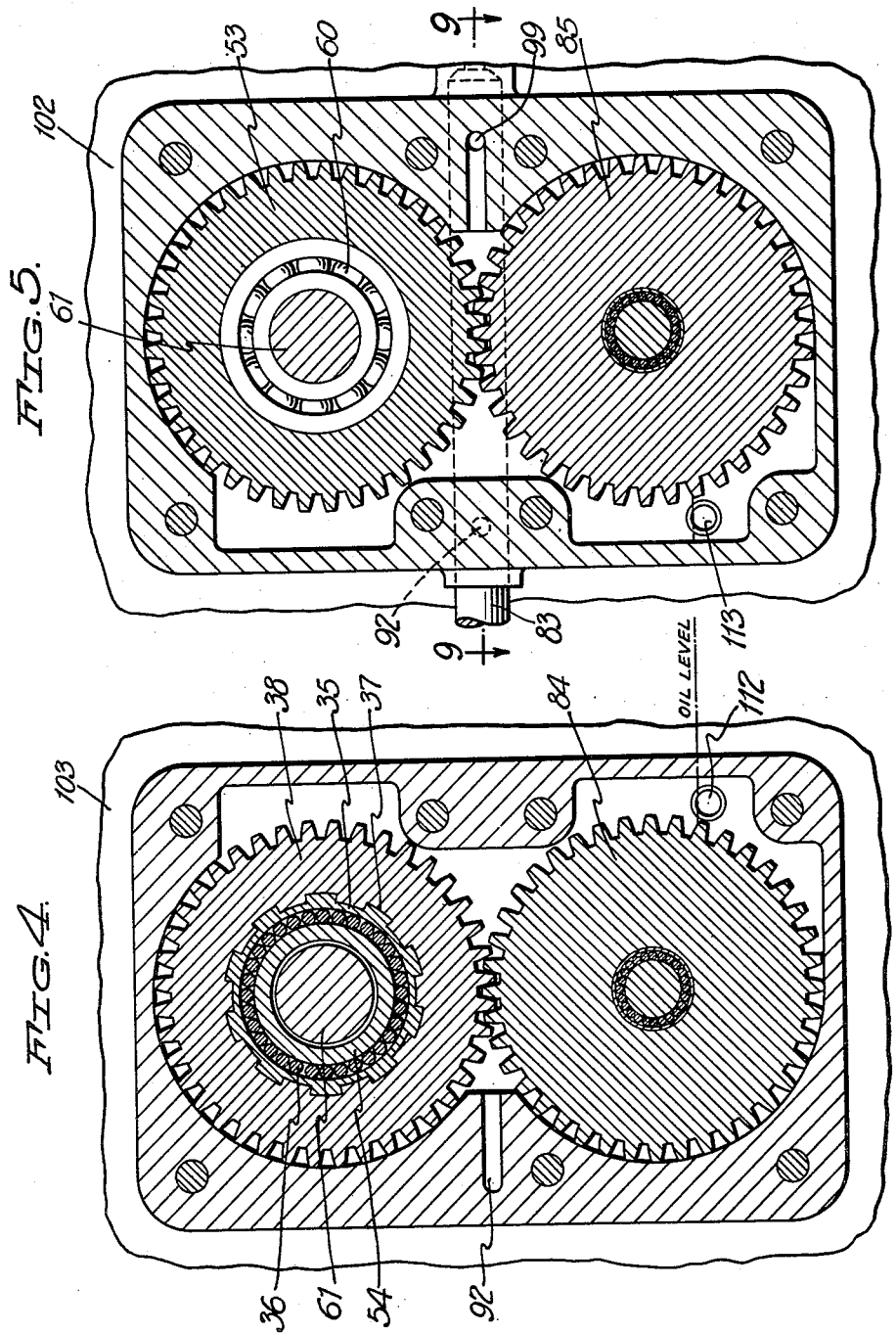

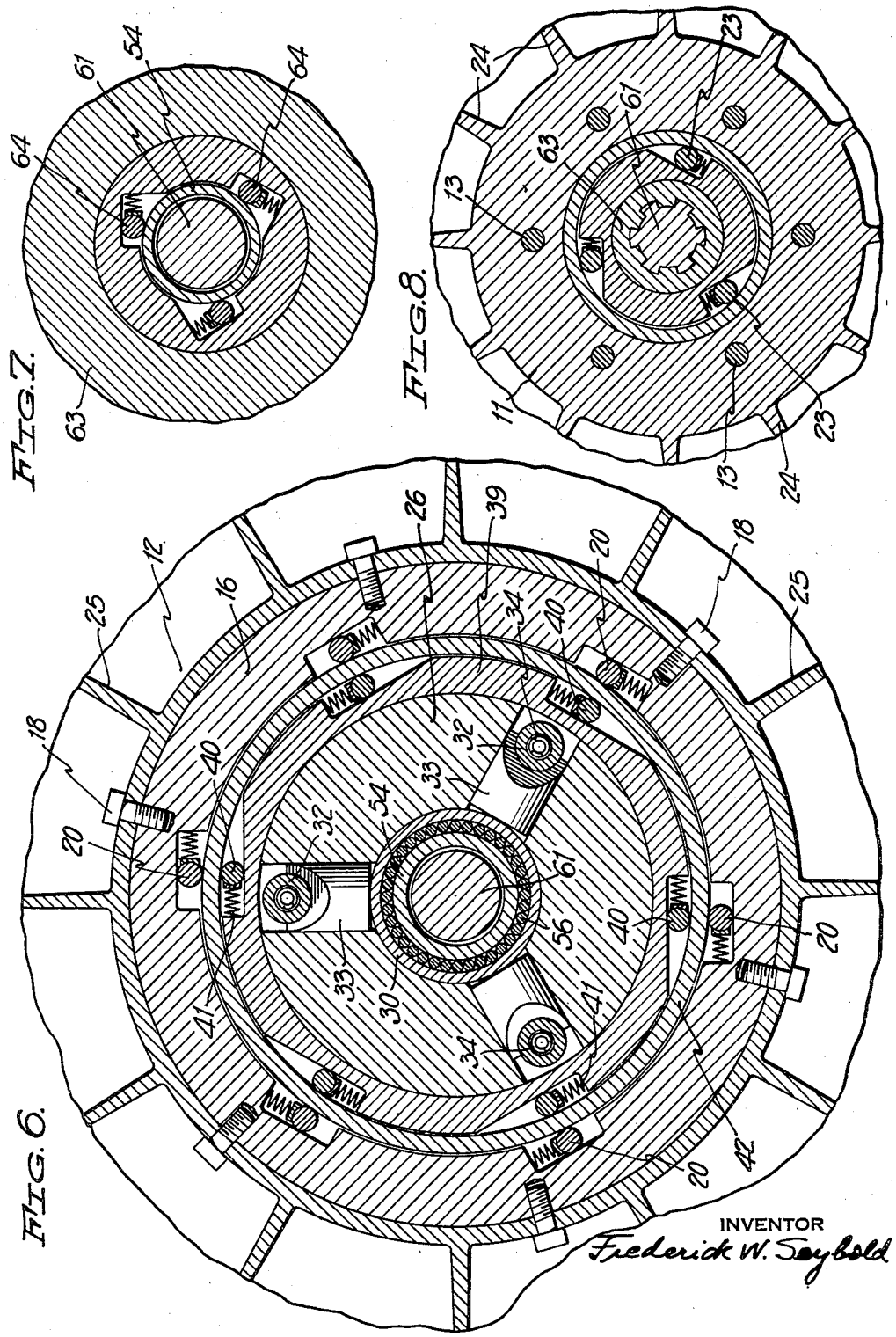

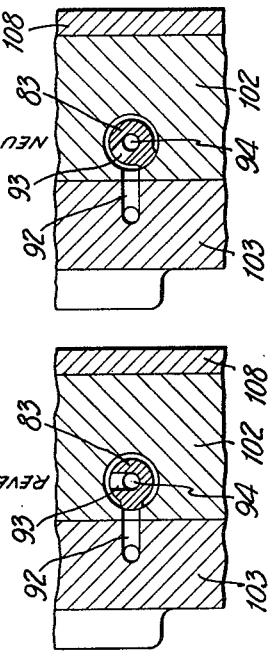
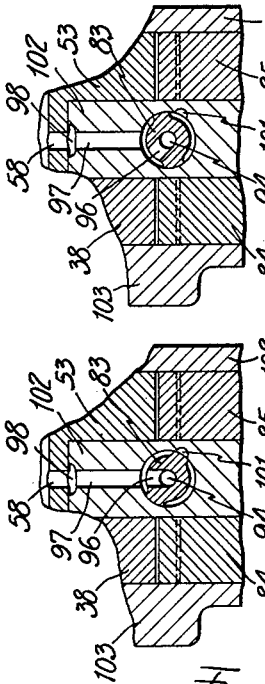
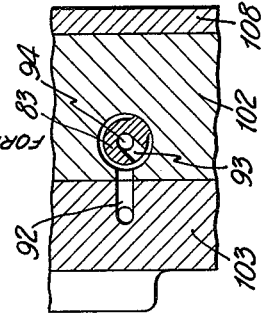

Patented Dec. 25, 1945

2,391,648

UNITED STATES PATENT OFFICE 2,391,648

AUTOMATIC TRANSMISSION

Frederick W. Seybold, Westfield, N. J.

Application October 27, 1943, Serial No. 508,080

22 Claims. (Cl. 74—189.5)

This invention relates to automatic variable speed transmission or torque converters and particularly to transmissions adaptable for use on motor vehicles or the like for transmitting power at variable speed and torque ratios between the engine and the drive shaft leading to the axles.

It is a primary object of this invention to provide a power transmission in which a low torque at high input shaft speed may be converted into a high torque at low output shaft speed.

A further object of this invention is to provide a power transmission mechanism in which the transition from low gear ratio thru intermediate and then into high gear ratio is accomplished smoothly without distinct steps or jerks and without the attention thereto or manipulation thereof on the part of the operator except the depression of the accelerator.

It is an object of this invention to provide such a power transmission in which the output shaft may remain stationary while the input shaft continues to rotate, and in which the output shaft may be made to rotate in a reverse direction from the direction of the input shaft without the use of an auxiliary gear set.

It is a further object of this invention to provide a power transmission in which the conventional friction clutch is eliminated and in which clutching action is obtained thru the use of the well known Föttinger fluid coupling.

It is another object of this invention to provide a transmission in which the tendency of the vehicle to creep at engine idling speeds due to the drag torque of the fluid coupling is practically eliminated.

A further object of this invention is to provide a power transmission in which only two planetary gear sets are employed to obtain low forward, intermediate or pick-up, direct drive and reverse operation of the vehicle.

It is another object of this invention to provide a power transmission with means to prevent "rollback" of the vehicle when the control lever is set for forward operation.

Another object of this invention is to provide a power transmission with means to prevent the output shaft from overrunning the input shaft.

It is a further object of this invention to provide a power transmission unit wherein practically all relative rotation of the planetary gearing ceases thereby reducing wear and gear noise to a minimum.

It is another object of this invention to provide a transmission unit in which the downward transition from high ratio into the lower ratios takes place at considerably lower engine and car speeds from those prevailing during the upward transition of the gear ratios.

With these and other objects in mind which will become apparent throughout the description, the invention resides in the novel construction, combination, and arrangement of the various parts substantially as hereinafter described and more particularly defined in the appended claims, it being understood that such changes in the precise embodiment of the invention may be made as come within the scope of the claims.

The accompanying drawings illustrate an example of the invention constructed to demonstrate the principles of the invention to the best advantage; and in which:

Figure 1 is a side elevational view in vertical longitudinal section through the power transmission unit;

Figure 2 is a transverse sectional view taken along the line 2—2 of Figure 1;

Figure 3 is a similar view taken along the line 3—3 of Figure 1;

Figure 4 is a transverse sectional view taken along the line 4—4 of Figure 1.

Figure 5 is a similar view taken along the line 5—5 of Figure 1;

Figure 6 is a transverse sectional view taken along the line 6—6 of Figure 1;

Figure 7 is a similar view taken along the line 7—7 of Figure 1;

Figure 8 is a transverse sectional view taken along the line 8—8 of Figure 1;

Figure 9 is a horizontal section taken along the line 9—9 of Figure 1;

Figure 10 is a side view of the control mechanism linkage and indicates the different valve settings;

Figure 11, 11A, 11B, and 11C are vertical sections taken along the line 11—11 of Figure 9;

Figure 12, 12A, 12B, and 12C are vertical sections taken along the line 12—12 of Figure 9;

Figure 13, 13A, 13B, and 13C are vertical sections taken along the line 13—13 of Figure 9.

Referring to the drawings in detail and in particular to Figure 1, the transmission unit is composed of seven assemblies to be hereinafter described.

1. *The primary driving assembly*

The primary driving assembly, comprising the split casing 11 and 12, is secured by means of bolts 13 to the flanged drive shaft 10. The casing section 11 is provided with the ring gear 14 which coacts with the conventional starter pinion.

The bolts 15 secure the casing section 12 to the section 11, thereby providing a container for the revolving transmission unit.

A combination roller brake 16 and internal gear 17 is secured by a series of bolts 18 and 19 to the casing section 12. Brake rollers 20 are kept in place by the retaining plate 21 secured to the roller brake 16 and ring gear 17 by screws (not shown). The anti-friction bearing 22 and the roller brake unit 23 whose function will be described later are seated concentrically in the casing section 11. A series of vanes 24 and 25 project from the casing sections 11 and 12 respectively to aid in heat dissipation therefrom.

2. The secondary driving assembly

The secondary driving assembly comprises the planet pinion carrier 26 with the planet 27 on the shafts 28 and the needle bearing 29, and together with the sun gear 30 of the reaction assembly and the internal gear 17 the carrier is so shaped to produce gear pump units which discharge fluid thru a series of ducts 31, said discharge can be completely cut off by the movement of the grooved piston valves 32 to the right produced by the centrifugal force developed by the pistons 33 overcoming the pressure of springs 34 acting on the piston valves 32.

The carrier 26 is fastened to the flanged sleeve 35, which is journalled on anti-friction rollers 36, and its multiple splines 37 engage the gear 38 of the gear pump shown in Figure 4.

The carrier 26 is also provided with the one-way clutch ring 39 and rollers 40 and springs 41 which co-operate with the cup-shaped member 42 to form a one-way driving clutch for the impeller 44 of a hydraulic coupling. The impeller 44 is fastened to the member 42 by the screws 43. The outer race of tapered roller bearing 45 is also secured to the impeller 44. The hub portion of member 42 is tapered at each end to serve as the outer race for the tapered roller bearings 46 and 47.

3. The intermediate floating assembly

The intermediate floating assembly consists of the runner 49 which is mounted on the tapered roller bearings 45 and 48, the spring 50 acts to maintain proper running clearance between the roller bearings 45 and 48. The internal ring gear 51 is fastened to the runner 49 by the screws 52.

4. The reaction assembly

The reaction assembly consists of the pump gear 53 whose long sleeve 54 is splined near the left hand end to engage the sun gear 55. The previously mentioned sun gear 30 is mounted on anti-friction rollers 56 on the sleeve 54 and also has one-way clutch or brake connections 57 with said sleeve. The roller bearings 46 and 47 are respectively mounted on the sun gears 30 and 55.

The long sleeve 54 is also provided with a series of ports 58 and 59, their function will be described later. The pump gear 53 is recessed to receive the ball bearing 60.

5. The driven assembly

The driven assembly comprises the driven shaft 61, one end of which is journalled in the tapered roller bearing 62, while the other splined end is mounted in the hub of the carrier 63. The latter is journalled on the tapered roller bearing 22 of the casing 11.

The combination ball bearing and one-way brake 64, Figures 1 and 7 serves as a bearing support for the long sleeve 54 and prevents "roll-back" of the vehicle when the transmission control is set for forward operation.

The one-way brake unit 23, Figures 1 and 8 prevents the driven assembly from overrunning the primary driving assembly, however, it may also serve as a clutch connection when the vehicle is pushed or drawn for engine starting in an emergency.

The extreme right hand end of shaft 61 is splined to engage the emergency brake pulley and coupling 65 to which the propeller shaft of the vehicle or other drive connection is attached. The nut 66 and lock washer 67 holds the member 65 securely in place. One or more planet pinions 68 are provided with needle bearings 69 journalled on shafts 70 on the carrier 63 and the cover 71, which is bolted to the carrier by means of screws 72 (Figure 2). The latter is provided with a concentric chamber 73 to co-operate with ports 59 in the sleeve 54 and sun gear 55 and ducts 74 leading to the cylinders 75 wherein the piston valves 76 coact with the radial pistons 77 in the carrier 63. The springs 78 urge the pistons 76 to left and force the pistons 77 radially inward. A series of ducts 79, together with the proper shaping of carrier 63 and the planetary pinions 68 and sun gear 55 form a fluid pump whose discharge thru the ducts 79 and past the grooves of piston valves 76 can be completely cut off by the radial outward movement of pistons 77 to overcome the pressure of the springs 78.

6. The control assembly

The control assembly consists essentially of a hand control lever attached to the steering wheel post in the conventional manner whereby the angular movement of this lever thru a suitable linkage partially indicated by link 80 connected to the lever 81 by means of the stud 82 positions the lever 81 for the various speed or torque ratios selected by the operator. The lever 81 is fastened to the valve rod 83, whose main function is to control the discharge of the two gear pumps shown in Figures 4 and 5.

The oil discharged by the gear set 38, 84 enters the duct 92 and unless this duct is closed, as shown in Figure 11, will flow thru the port 93 into the axial bore 94 and then to the pipe 95 which distributes the oil to the various lubricating points of the engine.

When the valve 83 is set as shown in Figures 12, 12A and 12B some of the oil escapes thru the port 96 into the duct 97 and chamber 98 and thru the ports 58 into the annular space formed by the shaft 61 and the long reaction sleeve 54. From there it will flow thru the ports 59 into the chamber 73 and thru the ducts 74 will act on the piston valves 76 and the pressure of this oil will force the pistons 77 radially inward, thereby opening the ducts 79 for free discharge of the gear pumps 51, 68.

When the duct 92 is closed as shown in Figure 11 the rotation of pump gears 38, 84 must cease, thereby causing the entire reaction assembly to rotate in the opposite direction and at a higher speed than the driving internal gear 17, with the net resultant rotation of the driven member 61 being opposite to that of the driving member, i. e., the vehicle will then operate in reverse.

Similarly when the valve 83 is set as shown in Figure 13B and 13C the discharge of gear pump 53, 85 must cease because the oil discharged thru duct 99 cannot now enter the axial bore 94 thru the port 100, thereby stalling the reaction sleeve 54 in order to absorb the torque reaction of the transmission in low and intermediate gear ratios.

A leakage duct 101, Figs. 9 and 12, permits oil to escape from the cylinders 75 and the connecting ducts and chambers when the valve 83 is turned into the position in which it is shown in Figure 12C.

7. *The transmission casing*

The transmission casing consists of four sections. The section 102 is bolted to the main casing 103 which is recessed for the pump gears 38 and 84 and also the oil seal 104 into which the hub of the casing 12 projects. This hub is provided with spring pockets 105 from which the springs 106 bear against the thrust bearing 107 which is fitted over the flanged sleeve 35.

The section 102 is recessed for the pump gears 53 and 85 and provides the bore for the valve 83. A cover 108 which provides a bore for the roller bearing 62 is bolted to section 102 and a bearing cap 109 with oil seal 110 is fastened by screws 111 to the cover 108.

Suitable openings 112 and 113 are provided for oil inlets to the pumps 38, 84 and 53, 85 respectively. The oil level, which is to be maintained also is indicated in Figures 1, 4, and 5.

OPERATION

A. *Idling or "neutral" position*

For neutral operation of the transmission the control lever on the steering wheel post will be set in the idling or "neutral" position which sets the valve 83 in the position as shown in Figures 11A, 12A and 13A whereby no power from the engine shaft 10 is transmitted to the driven shaft 61. Free discharge of oil from both gear pumps 38, 84 and 53, 85 takes place and at this idling speed the runner 49 will attain approximately the speed of the impeller 44 and as the carrier 63 is stationary the sun gear 55 rotates in opposite direction to that of the internal gear 51 and at a speed of 72/48=1.5 times that of the internal gear 51, assuming that the latter has 72 teeth and the sun gear 55 has 48 teeth. This gear ratio, may, of course, be varied to suit different conditions.

As stated before the members 44 and 49 rotate at approximately the same speed and as the reaction assembly with sun gear 30 rotates in the opposite sense 1.5 times as fast, the internal gear 17 must, therefore, rotate $$1+(30/72\times 2.5)=147/72=2\tfrac{1}{24}$$

times as fast in the same direction as the impeller 44, assuming the internal gear 17 has 72 teeth and the sun gear 30 has 30 teeth for purpose of illustration.

The carrier 26 with the planetary pinions will then rotate 72/147=.490 times that of the drive shaft 10 and internal gear 17, and in the same direction.

While the vehicle is in "neutral" position the engine may be run at any speed for warming up, provided the emergency brake is on. In this position the hydraulic coupling rotates at a speed less than ½ that of the engine and the drag torque then is only about 24% as great as it would be if the impeller were directly connected to the engine drive shaft.

B. *Forward motion in "low" gear*

To produce forward motion in "low" gear the control lever is moved into the forward position whereby the valve 83 is set as shown in Figures 11C and 13C. The discharge duct 99 is closed, stalling pump gears 53, 85 and the reaction sleeve 54 with sun gear 55. The sun gear 30 will also cease to rotate, because the one-way clutch rollers 57 prevent further rotation in a direction opposite to that of the engine drive shaft.

This will then accelerate the impeller 44 so that it will now rotate at a speed of $$\frac{72}{72+30}=.706$$

times that of the internal gear 17 and in the same direction.

If now the engine is accelerated the torque developed in the fluid coupling 44—49 will be transmitted thru the internal gear 51 to the planetary pinions 68 on the carrier 63 of the driven shaft, which will now rotate at a speed of $$.706\times\frac{72}{72+48}=.423$$

times the speed of the drive shaft 10. The output torque is now $$\frac{1}{.423} \text{ or } 2.36$$

times greater than the input torque.

The size of the hydraulic coupling will be somewhat larger than would be the case if it were direct connected to the drive shaft, as the torque capacity varies as the fifth power of the diameter of the coupling.

C. *Forward motion in "intermediate" gear*

As the engine and car speed increase the centrifugal force developed by the pistons 33 will overcome the pressure of springs 34 and move the piston valves 32 to the right closing the discharge ports of the planetary gear pump 27, 30 and thereby compelling the impeller 44, carrier 26 and sun gear 30 to rotate at engine speed. The one-way clutch 57 of the sun gear 30 will now overrun the reaction sleeve 54 which remains stationary. The increased speed of the impeller 44 will, of course, also increase the speed of the runner 49 and the output shaft speed ratio is now $$\frac{72}{72+48}=.600$$

times that of the drive shaft 10 and the output torque is 1/.6=1.667 times the input torque.

D. *Forward motion in "high" gear*

As the engine and car speed increases still further, the centrifugal force acting on the pistons 77 will increase to such an extent that it will overcome the pressure of springs 78 forcing the piston valves 76 to the right, thereby closing the discharge ports of the planetary gear pump 55, 68 and compelling the reaction sleeve 54 and carrier 63 to rotate at practically engine speed, i. e., the slip in the fluid coupling 44, 49 is usually about 2–3%. The output torque is now equal to the input torque, except for small frictional losses. Planetary action of the two gear sets has practically ceased, thereby reducing wear and gear noise to a minimum. The oil which the pump gears 38, 84 discharge under pressure is fed into pipe 95 and lubricates the various bearings, etc., of the engine.

E. Forward motion in "pick-up" gear

If for any reason it is desired that the car proceed in the intermediate gear ratio for passing another car or for climbing a steep hill, a "pick-up" position for the control lever has been provided. When the latter is set in this position the valve 83 has the setting as shown in Figures 11B, 12B, and 13B.

Oil pressure is now available from the gear pump 38, 84 which enters the duct 97, chamber 98, ports 58 and into the annular chamber formed by the sleeve 54 and driven shaft 61, thence thru the ports 59 into chamber 73 and ducts 74 into the cylinders 75 forcing the piston valves 76 to the left and the pistons 77 radially inward. The reaction of the drive will be taken by the sun gear 55 on the sleeve 54 and the pump 53, 85 will stall and the transmission will operate in the "intermediate" gear ratio regardless of engine speed.

Should the engine speed fall below a certain amount then the pressure of spring 34 will exert itself and force the pistons 33 radially inward, opening the discharge ports of the piston valves 32, the sun gear 30 will tend to turn in the opposite sense to the drive shaft and will become stalled as the one-way clutch rollers 57 will lock on the reaction sleeve 54 which is stationary, resulting in "low" gear operation of the transmission.

It should be pointed out here that the downward transition from high gear ratio into intermediate or from intermediate to low gear ratio occurs at lower engine or car speeds than during the upward transition. This is due the location of the pistons 53 and 77 in their respective carriers 26 and 63.

F. Stopping the car

If the engine speed is permitted to return to idling, i. e., such as would be the case for stopping the car, the transmission will automatically return to the "low" ratio condition, in which the car can now be stopped by the brakes, the torque developed at idling in the fluid coupling being insufficient to drive the car the operator need not alter the control lever setting, i. e., "forward" for example.

To again put the car into forward motion the operator need only depress the accelerator pedal and the transmission will pass from "low" into "intermediate" into "high" as fast as torque and car speed will permit without further manipulation on the part of the driver.

G. "Reverse" operation

For reverse operation of the transmission, the control lever 83 will have the setting as shown in Figures 11 and 13. The discharge from the duct 92 will be completely closed, stalling the gear pump 38, 84 and the secondary driving assembly. The discharge duct 99 of the reaction assembly gear pump 53, 85, however, is open permitting the reaction assembly to rotate in the opposite direction to that of the drive shaft 10. The internal gear 17 will then rotate the sun gear 30 72/30=2.4 times as fast as the engine in the opposite direction. The overrunning clutch rollers 57 drive the reaction sleeve 54 and sun gear 55. If we now assume that the engine is idling and the output shaft 61 remains stationary the sun gear 55 will turn the internal gear 51 and runner 49 in the same direction as the drive shaft 10 but 48/72×2.4=1.6 times as fast. The runner 49 now becomes the fluid impeller and the energy developed by it is transmitted to the member 44 which can overrun the carrier 26 which is now stalled.

The one-way brake unit 16 of the primary driving assembly prevents the member 44 from overrunning the drive shaft 10.

If the engine is now speeded up the relative difference in speed between impeller 44 and runner 49 is reduced until they are approximately equal with the result that the driven shaft will begin to rotate at reduced speed but in the opposite direction to that of the input shaft 10.

The carrier 63 will therefore turn $$-\frac{(48 \times 2.4)+72}{72+48} = -\frac{43.2}{120} = -.360$$

times the speed of the drive shaft and the output torque in reverse is $$\frac{1}{.360} = 2.78$$

times the input torque.

As the rotational speed of the reaction sleeve 54 is greater than that of the output shaft 61 the "no-roll-back" device, Figure 7, becomes automatically ineffective during reverse operation of the transmission.

The gear pump 53, 85 now supplies oil to the various bearings, etc. of the engine thru the axial bore 94 and the pipe 95.

The torque and gear ratios illustrated correspond to those now found on present day cars having manual three forward and reverse shifting type transmissions, but it should be understood that these ratios may be varied to suit any particular operating conditions.

While this transmission has been described in detail, it is obvious that various modifications, rearrangements and minor improvements will suggest themselves to those skilled in the art and all such modifications, rearrangements and minor improvements shall fall within the scope of the following claims.

I claim:

1. A variable speed transmission comprising in combination, a drive shaft, a driven shaft, a reaction member including first and second sun gears mounted for rotation about the axis of the driven shaft, a fluid pump for locking said member against rotation in one direction, or releasing the same, a first internal gear connected to the drive shaft, and encircling said first sun gear, first planetary gearing meshing with the first sun and internal gears, a hydraulic impeller connected to said first planetary gearing, second planetary gearing attached to the driven shaft and meshing with the second sun gear and a second internal gear, and a hydraulic runner attached to said second internal gear co-operating to form a hydraulic coupling with the impeller of the first planetary gearing.

2. A variable speed transmission comprising in combination, a drive shaft, a driven shaft, a reaction member including first and second sun gears mounted for rotation about the axis of the driven shaft, a fluid pump for locking said member against rotation in one direction, or releasing the same, a first internal gear connected to the drive shaft and encircling said first sun gear, first planetary gearing meshing with the first sun and internal gears, overrunning clutch means connecting said first planetary gearing and a hydraulic impeller, second planetary gearing attached to the driven shaft and meshing with the second sun gear and a second internal gear, and a hydraulic runner attached to said second internal gear co-operating to form a hydraulic coupling with the impeller of the first planetary gearing.

3. A variable speed transmission comprising, a drive shaft, a driven shaft, a reaction member including first and second sun gears mounted for rotation about the axis of the driven shaft, control means including a fluid pump and valve for locking said member against rotation in one direction, or releasing the same, a first internal gear connected to the drive shaft, and first planetary gearing connecting the first sun gear of the reaction member and the first internal gear, a fluid impeller, overrunning clutch means connecting the first planetary gearing and said impeller, second planetary gearing connected to the driven shaft and meshing with a second internal gear and the second sun gear of the reaction member, a hydraulic runner connected to the second internal gear and positioned to be driven by fluid energized by the impeller and driving the driven shaft at reduced speed but increased torque when said reaction member is locked against rotation, and revolving the reaction member idly when said member is released by said control means.

4. A variable speed transmission comprising, a drive shaft, a driven shaft, a reaction member including first and second sun gears mounted for rotation about the axis of the driven shaft, control means including a fluid pump and valve for regulating the discharge thereof, for locking said member against rotation in one direction, or releasing the same, a duct leading to bearings to be lubricated, a first internal gear connected to the drive shaft, and first planetary gearing connecting the first sun gear of the reaction member and the first internal gear, a fluid impeller, overrunning clutch means connecting the first planetary gearing and said impeller, second planetary gearing connected to the driven shaft and meshing with a second internal gear and the second sun gear of the reaction member, a hydraulic runner connected to the second internal gear and positioned to be driven by fluid energized by the impeller and driving the driven shaft at reduced speed but increased torque when said reaction member is locked against rotation, and revolving the reaction member idly when said member is released by said control means.

5. In a variable speed transmission, driving and driven shafts, a reaction member composed of first and second sun gears and a fluid pump for locking said member against rotation in one direction, or releasing the same, a hydraulic coupling, first and second internal gears encircling said sun gears and respectively connected to the runner of the hydraulic coupling and the drive shaft, a first planetary pinion carrier attached to the driven shaft, pinions on said carrier, the pinions meshing with the first sun and internal gears, a second planetary pinion carrier whose pinions mesh with said second sun and internal gears overrunning clutch rollers to co-operate with the reaction member and prevent rotation of said second sun gear in a direction opposite to the drive shaft when the reaction member is locked, said second carrier, pinions and second sun gear forming fluid pumps, a closed channel for a fluid, movable valves in said channel to prevent discharge of fluid therefrom, whereby relative rotation of the gearing ceases thus causing the impeller of the hydraulic coupling means to rotate at practically the same speed as the drive shaft.

6. In a variable speed transmission comprising, a drive shaft, a driven shaft, a reaction member including first and second sun gears mounted for rotation about the axis of the driven shaft, control means including a fluid pump and valve for locking said member against rotation in one direction, or releasing the same, a first internal gear connected to the drive shaft, and first planetary gearing connecting the first sun gear of the reaction member and the first internal gear, a fluid impeller, an overrunning clutch, whereby said planetary gearing transmits driving torque to said fluid impeller, second planetary gearing connected to the driven shaft and meshing with the second internal gear and the second sun gear of the reaction member, a hydraulic runner connected to the second internal gear and positioned to be driven by fluid energized by the impeller, said first planetary gears and the first sun gear comprising the operating elements of fluid pumps for circulating fluid along a path, centrifugally actuated valve means in said path to interrupt the flow of the circulating fluid, causing the impeller and the runner to rotate at practically the speed of the drive shaft.

7. In a variable speed transmission, driving and driven shafts, gearing and hydraulic means for conecting said shafts including a reaction member composed of a first sun gear and a fluid pump for locking said member against rotation in one direction or releasing the same, an internal gear connected to the drive shaft, a planetary pinion carrier, the pinions meshing with a second sun gear provided with overrunning clutch rollers co-operating with the reaction member to prevent rotation of said second sun gear in a direction opposite to the drive shaft when the reaction member is locked, said carrier, pinions and second sun gear forming fluid pumps, a closed channel for a fluid, a valve in said channel, and valve actuating mechanism including a centrifugal device mounted on said carrier for actuating said valve in one direction, and means for opposing the action of said centrifugal device and actuating said valve in the reverse direction.

8. In a variable speed transmission, driving and driven shafts, gearing and hydraulic means for connecting said shafts including a reaction member composed of a first sun gear and a fluid pump and valve for regulating the discharge thereof, for locking said member against rotation in one direction or releasing the same, an internal gear connected to the drive shaft, a planetary pinion carrier, the pinions meshing with a second sun gear provided with overrunning clutch rollers co-operating with the reaction member to prevent rotation of said second sun gear in a direction opposite to the drive shaft when the reaction member is locked, said carrier revolvable about the axis of the driven shaft which defines, in association with the pinions, sun and internal gears, a closed channel for a fluid, said pinions and gears co-operating in pumping fluid through said channel when the carrier rotates, a valve in said channel, and valve actuating mechanism including a centrifugal device mounted on said carrier for actuating said valve in one direction, and means for yieldingly opposing the action of said centrifugal device and actuating said valve in the reverse direction.

9. In a variable speed transmission, driving and driven shafts, a reaction member composed of first and second sun gears and a fluid pump for locking said member against rotation in one direction, or releasing the same, a hydraulic coupling, first and second internal gears encircling said sun gears and respectively connected to the runner of the hydraulic coupling and the drive shaft, a first planetary pinion carrier attached to the driven shaft, pinions on said carrier, the pinions meshing with the first sun and internal gears, a second planetary pinion carrier with pinions meshing with said second sun gear, overrunning clutch rollers co-operating with the reaction member and said second sun gear, roller brake means between the first planetary pinion carrier and the reaction member to prevent rotation of said driven shaft in a direction opposite to the drive shaft when the reaction member is locked and the transmission is set for forward operation.

10. In a variable speed transmission, driving and driven shafts, a reaction member composed of first and second sun gears and a fluid pump for locking said member against rotation in one direction, or releasing the same, a hydraulic coupling, first and second internal gears encircling said sun gears and respectively connected to the runner of the hydraulic coupling and the drive shaft, a first planetary pinion carrier attached to the driven shaft, pinions on said carrier, the pinions meshing with the first sun and internal gears, a second planetary pinion carrier with pinions meshing with said second sun gear, overrunning clutch rollers co-operating with the reaction member and said second sun gear, roller brake means between the first planetary pinion carrier and the reaction member to prevent rotation of said driven shaft in a direction opposite to the drive shaft when the reaction member is locked, said roller brake means being rendered automatically inoperative when the transmission is set for reverse operation.

11. In a variable speed transmission, driving and driven shafts, a reaction member composed of first and second sun gears and a fluid pump for locking said member against rotation in one direction, or releasing the same, a hydraulic coupling, first and second internal gears encircling said sun gears and respectively connected to the runner of the hydraulic coupling and the drive shaft, a first planetary pinion carrier attached to the driven shaft, pinions on said carrier, the pinions meshing with the first sun and internal gears, a second planetary pinion carrier with pinions meshing with said second sun gear, overrunning clutch rollers co-operating with the reaction member and said second sun gear to prevent rotation of said second sun gear in a direction opposite to the drive shaft when the reaction member is locked, and roller brake means between the driven shaft and the drive shaft to prevent the driven shaft from overrunning the drive shaft when the transmission is set for forward operation.

12. A variable speed transmission comprising in combination, a drive shaft, a driven shaft, a reaction member, including first and second sun gears mounted for rotation about the axis of the driven shaft, a hydraulic coupling, first and second internal gears encircling said sun gears and respectively connected to the runner of the hydraulic coupling and the drive shaft, first planetary gears attached to the driven shaft and meshing with the first sun and internal gears, a second planetary gearing meshing with the second sun and internal gears, and means including a clutch for automatically connecting the second planetary gearing to the impeller of the hydraulic coupling and means defining in association with the second internal and sun gears a plurality of endless fluid circulation ducts, one for each planetary gear, the planetary gears and sun gear co-operating to pump liquid through said ducts as the internal and sun gears relatively rotate, a fluid flow control valve in each duct, and centrifugal means for actuating said control valves to interrupt flow through said ducts and thereby lock the planetary gears against rotation about their axes, causing the impeller to rotate at approximately the angular velocity of the drive shaft.

13. A variable speed transmission comprising in combination, a drive shaft, a driven shaft, a reaction member, including first and second sun gears mounted for rotation about the axis of the driven shaft, a fluid pump and valve for locking said member against rotation, or releasing the same, a hydraulic coupling, first and second internal gears encircling said sun gears and respectively connected to the runner of the hydraulic coupling and the drive shaft, a first planetary pinion carrier attached to the driven shaft, the pinions meshing with the first sun and internal gears, a second planetary pinion carrier whose pinions mesh with the second sun and internal gears, and means including a clutch for automatically connecting the second planetary pinion carrier to the impeller of the hydraulic coupling and means defining in association with the first and second internal and sun gears, respectively, a plurality of endless fluid circulation ducts, one for each planetary pinion, the planetary pinions and sun gears co-operating to pump liquid through said ducts as the internal and sun gears relatively rotate, a fluid flow control valve in each duct, and centrifugal means for actuating said control valves to interrupt flow through said ducts and means for yieldingly opposing the action of said centrifugal means whereby to lock the planetary pinions against rotation about their axes, causing the impeller and the driven shaft to rotate at approximately the angular velocity of the drive shaft.

14. A variable speed transmission comprising in combination, a drive shaft, a driven shaft, a reaction member, including first and second sun gears mounted for rotation about the axis of the driven shaft, the second sun gear being free to overrun the reaction member, a hydraulic coupling, first and second internal gears encircling said sun gears and respectively connected to the runner of the hydraulic coupling and the drive shaft, a first planetary pinion carrier attached to the driven shaft, the pinions meshing with the first sun and internal gears, and means including a clutch for automatically connecting a second planetary pinion carrier, whose pinions mesh with the second sun and internal gears, to the impeller of the hydraulic coupling and means defining in association with the first and second internal and sun gears, respectively, a plurality of endless fluid circulation ducts, one for each planetary pinion, the planetary pinions and sun gears co-operating to pump liquid through said ducts as the internal and sun gears relatively rotate, a fluid flow control valve in each duct, and centrifugal means for actuating said control valve to interrupt flow through said ducts and thereby lock the planetary pinions against rotation about their axes, causing the impeller and the driven shaft to rotate at approximately the angular velocity of the drive shaft.

15. A variable speed transmission comprising in combination, a drive shaft, a driven shaft, a reaction member, including first and second sun gears mounted for rotation about the axis of the driven shaft, the second sun gear being free to overrun the reaction member, a first fluid pump and valve for locking said member against rotation, or releasing the same, a hydraulic coupling, first and second internal gears encircling said sun gears, and respectively connected to the runner of the hydraulic coupling and the drive shaft, a first planetary pinion carrier attached to the driven shaft, the pinions meshing with the first sun and internal gears, and means including a clutch for automatically connecting a second planetary pinion carrier, whose pinions mesh with the second sun and internal gears, to the impeller of the hydraulic coupling, a second fluid pump connected to said second pinion carrier, a duct leading to one or more bearings, and means defining in association with the first and second internal and sun gears, respectively, a plurality of endless fluid circulation ducts, one for each planetary pinion, the planetary pinions and sun gears co-operating to pump liquid through said ducts as the internal and sun gears relatively rotate, a fluid flow control valve in each duct, and centrifugal means for actuating said control valves to interrupt flow through said ducts and thereby lock the planetary pinions against rotation about their axes, causing the impeller and the driven shaft to rotate at approximately the angular velocity of the drive shaft.

16. A variable speed transmission comprising, a drive shaft, a driven shaft, a member including first and second sun gears mounted for rotation about the axis of the driven shaft, a first fluid pump associated with said member, a duct leading to bearings to be lubricated, a first internal gear connected to the drive shaft, a first planetary pinion carrier connecting the first sun gear of said member and the first internal gear, a second fluid pump associated with said pinion carrier, a valve for regulating the discharge of both pumps, a second planetary pinion carrier connecting the driven shaft and the second internal gear and the second sun gear of said member, a first fluid coupling member mounted on the first planetary pinion carrier and free to rotate in the same direction as the drive shaft, brake means between said first fluid coupling member and the drive shaft, a second fluid coupling member connected to the second internal gear and positioned to drive the first fluid coupling member, driving the driven shaft at reduced speed but increased torque in opposite direction to the drive shaft when the second fluid pump is locked against rotation.

17. A variable speed transmission comprising, a drive shaft, a driven shaft, a member including first and second sun gears mounted for rotation about the axis of the driven shaft, a first fluid pump associated with said member, a duct leading to bearings to be lubricated, a first internal gear connected to the drive shaft, a first planetary pinion carrier connecting the first sun gear of said member and the first internal gear, a second fluid pump associated with said pinion carrier, a valve for regulating the discharge of both pumps, a second planetary pinion carrier connecting the driven shaft and the second internal gear and the second sun gear of said member, a first fluid coupling member mounted on the first planetary pinion carrier and free to rotate in the same direction as the drive shaft, roller brake means between said first fluid coupling member and the drive shaft, a second fluid coupling member connected to the second internal gear and positioned to drive the first fluid coupling member, driving the driven shaft at reduced speed but increased torque in opposite direction to the drive shaft when the second fluid pump is locked against rotation.

18. A variable speed transmission comprising, a drive shaft, a driven shaft, a first sun gear mounted for rotation about the axis of the driven shaft, a second sun gear free to overrun said first sun gear in one direction and capable to drive it in the other direction, a first internal gear, a first planetary pinion carrier on the driven shaft connecting the first sun gear and the first internal gear, a second internal gear connected to the drive shaft, a second planetary pinion carrier connecting the second internal gear and the second sun gear, a fluid pump associated with said second pinion carrier, a valve for regulating the discharge of said pump, a first fluid coupling member connected to the first internal gear, a second fluid coupling member mounted on the second planetary pinion carrier and free to rotate in the same direction as the drive shaft, roller brake means between said second fluid coupling member and the drive shaft, driving the driven shaft at reduced speed but increased torque in the opposite direction to the drive shaft when the fluid pump is locked against rotation.

19. A variable speed transmission comprising, a drive shaft, a driven shaft, a first sun gear mounted for rotation about the axis of the driven shaft, a second sun gear free to overrun said first sun gear in one direction and capable to drive it in the other direction, a first fluid pump associated with said first sun gear, a duct leading to bearings to be lubricated, a first internal gear, a first planetary pinion carrier on the driven shaft connecting the first sun gear and the first internal gear, a second internal gear connected to the drive shaft, a second planetary pinion carrier connecting the second internal gear and the second sun gear, a second fluid pump associated with said second pinion carrier, a valve for regulating the discharge of both pumps, a first fluid coupling member connected to the first internal gear, a second fluid coupling member mounted on the second planetary pinion carrier and free to rotate in the same direction as the drive shaft, roller brake means between said second fluid coupling member and the drive shaft, driving the driven shaft at reduced speed but increased torque in the opposite direction to the drive shaft when the second fluid pump is locked against rotation.

20. A variable speed transmission comprising in combination, a drive shaft, a driven shaft, a first sun gear mounted for rotation about the axis of the driven shaft, a second sun gear free to overrun said first sun gear in one direction and capable to drive it in the other direction, a first fluid pump and valve for locking both sun gears against rotation, or releasing the same, a hydraulic coupling, first and second internal gears encircling said sun gears and respectively connected to the runner of the hydraulic coupling and the drive shaft, a first planetary pinion carrier attached to the driven shaft, the pinions meshing with the first sun and internal gears, and means including a clutch for automatically connecting a second planetary pinion carrier, whose pinions mesh with the second sun and internal gears, to the impeller of the hydraulic coupling, a second fluid pump connected to said second pinion carrier, a duct leading to one or more bearings, and means defining in association with the first and second internal and sun gears, respectively, a plurality of endless fluid circulation ducts, one for each planetary pinion, the planetary pinions and sun gears co-operating to pump liquid through said ducts as the internal and sun gears relatively rotate, a fluid flow control valve in each duct, and centrifugal means for actuating said control valves to interrupt flow through said ducts and thereby lock the planetary pinions against rotation about their axes, causing the impeller and the driven shaft to rotate at approximately the angular velocity of the drive shaft, and means for opposing the action of the centrifugal means to prevent locking of the pinions of the first planetary pinion carrier or unlocking the same.

21. A variable speed transmission comprising in combination, a drive shaft, a driven shaft, a first sun gear mounted for rotation about the axis of the driven shaft, a second sun gear free to overrun said first sun gear in one direction and capable to drive it in the other direction, a first fluid pump and valve for locking said sun gears against rotation, or releasing the same, a hydraulic coupling, first and second internal gears encircling said sun gears and, respectively connected to the runner of the hydraulic coupling and the drive shaft, a first planetary pinion carrier attached to the driven shaft, the pinions meshing with the first sun and internal gears, and means including a clutch for automatically connecting a second planetary pinion carrier, whose pinions mesh with the second sun and internal gears, to the impeller of the hydraulic coupling, a second fluid pump connected to said second pinion carrier, a duct leading to one or more bearings, and means defining in association with the first and second internal and sun gears, respectively, a plurality of endless fluid circulation ducts, one for each planetary pinion, the planetary pinions and sun gears co-operating to pump liquid through said ducts as the internal and sun gears relatively rotate, a fluid flow control valve in each duct, and centrifugal means for actuating said control valves to interrupt flow through said ducts and thereby lock the planetary pinions against rotation about their axes, causing the impeller and the driven shaft to rotate at approximately the angular velocity of the drive shaft, and hydraulic means for opposing the action of the centrifugal means to prevent locking of the pinions of the first planetary pinion carrier or unlocking the same.

22. A variable speed transmission comprising in combination, a drive shaft, a driven shaft, a first sun gear mounted for rotation about the axis of the driven shaft, a second sun gear free to overrun said first sun gear in one direction and capable to drive it in the other direction, a first fluid pump and valve for locking both sun gears against rotation, or releasing the same, a hydraulic coupling, first and second internal gears encircling said sun gears and, respectively connected to the runner of the hydraulic coupling and the drive shaft, a first planetary pinion carrier attached to the driven shaft, the pinions meshing with the first sun and internal gears, and means including a clutch for automatically connecting a second planetary pinion carrier, whose pinions mesh with the second sun and internal gears, to the impeller of the hydraulic coupling, a second fluid pump connected to said second pinion carrier, a duct leading to one or more bearings, and means defining in association with the first and second internal and sun gears, respectively, a plurality of endless fluid circulation ducts, one for each planetary pinion, the planetary pinions and sun gears co-operating to pump liquid through said ducts as the internal and sun gears relatively rotate, a fluid flow control valve in each duct, and centrifugal means for actuating said control valves to interrupt flow through said ducts and thereby lock the planetary pinions against rotation about their axes, causing the impeller and the driven shaft to rotate at approximately the angular velocity of the drive shaft, and manual means to position said valve to vary the speed ratio of the transmission.

FREDERICK W. SEYBOLD.